US011320556B2

(12) United States Patent
Shan et al.

(10) Patent No.: US 11,320,556 B2
(45) Date of Patent: May 3, 2022

(54) SYSTEM AND METHOD FOR SEISMIC IMAGING OF COMPLEX SUBSURFACE VOLUMES

(71) Applicant: Chevron U.S.A. Inc., San Ramon, CA (US)

(72) Inventors: Guojian Shan, Sugar Land, CA (US); Yue Wang, Sugar Land, TX (US); Siwei Li, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 245 days.

(21) Appl. No.: 16/548,582

(22) Filed: Aug. 22, 2019

(65) Prior Publication Data
US 2021/0055438 A1 Feb. 25, 2021

(51) Int. Cl.
*G01V 1/34* (2006.01)
*G01V 1/28* (2006.01)
(Continued)

(52) U.S. Cl.
CPC .............. *G01V 1/345* (2013.01); *G01V 1/282* (2013.01); *G01V 1/301* (2013.01); *G01V 1/362* (2013.01);
(Continued)

(58) Field of Classification Search
CPC ........ G01V 1/345; G01V 1/282; G01V 1/301; G01V 1/362; G01V 2210/512
See application file for complete search history.

(56) References Cited

U.S. PATENT DOCUMENTS

| 5,588,032 A | 12/1996 | Johnson et al. |
| 6,005,916 A | 12/1999 | Johnson et al. |

(Continued)

FOREIGN PATENT DOCUMENTS

| EP | 2056124 B1 | 5/2011 |
| EP | 2638415 A2 | 9/2013 |

(Continued)

OTHER PUBLICATIONS

J.C. Shragge et al., "4D Seismic Wave-equation Depth Migration Velocity Inversion," Conference Proceedings, 74th EAGE Conference and Exhibition incorporating EUROPEC 2012, Jun. 2012.

(Continued)

*Primary Examiner* — Bryan Bui
(74) *Attorney, Agent, or Firm* — Marie L. Clapp

(57) ABSTRACT

A method is described for seismic imaging including generating extended image gathers by extended reverse time migration of a seismic dataset using an earth model; processing the extended image gathers to generate processed image gathers; performing extended modeling based on the processed image gathers to generate a modeled seismic dataset; enhancing the processed image gathers to generate an enhanced image; performing extended modeling based on the enhanced image gathers to generate a modeled enhanced dataset; differencing the modeled enhanced dataset and the modeled seismic dataset to determine a data residual; inverting the data residual to generate a model residual; updating the earth model based on the model residual to create an updated earth model; performing seismic imaging of the seismic dataset using the updated earth model to create an improved seismic image. The method may be executed by a computer system.

7 Claims, 5 Drawing Sheets

(51) Int. Cl.
*G01V 1/30* (2006.01)
*G01V 1/36* (2006.01)

(52) U.S. Cl.
CPC .. *G01V 2210/512* (2013.01); *G01V 2210/614* (2013.01)

(56) References Cited

U.S. PATENT DOCUMENTS

| | | |
|---|---|---|
| 7,841,982 B2 | 11/2010 | Johnson et al. |
| 8,246,543 B2 | 8/2012 | Johnson et al. |
| 8,571,287 B2 | 10/2013 | DeMan et al. |
| 8,729,903 B2 | 5/2014 | Smka et al. |
| 9,013,956 B2 | 4/2015 | Hill |
| 9,470,811 B2 | 10/2016 | Sun et al. |
| 9,476,996 B2 | 10/2016 | Pica et al. |
| 9,482,770 B2 | 11/2016 | Sun |
| 9,529,109 B2 | 12/2016 | Bennett et al. |
| 9,600,775 B2 | 3/2017 | Coles et al. |
| 9,702,997 B2 | 7/2017 | Sava et al. |
| 9,779,502 B1 | 10/2017 | Lovberg et al. |
| 9,857,489 B2 | 1/2018 | Lambare et al. |
| 9,973,246 B2 | 5/2018 | Forenza et al. |
| 9,977,141 B2 | 5/2018 | Liu |
| 10,175,350 B1 | 1/2019 | Tsokos et al. |
| 10,234,581 B2 * | 3/2019 | Hu .......... G01V 1/282 |
| 10,871,584 B2 * | 12/2020 | Jiao .......... G01V 1/282 |
| 10,942,286 B2 * | 3/2021 | Albertin ........ G01V 1/303 |
| 2013/0311149 A1 | 11/2013 | Tang et al. |

FOREIGN PATENT DOCUMENTS

| | | |
|---|---|---|
| WO | 2018031113 A1 | 2/2018 |
| WO | 2018102043 A1 | 6/2018 |
| WO | 2018175013 A1 | 9/2018 |

OTHER PUBLICATIONS

P. Sava et al., "Wave-Equation Migration Velocity Analysis. II. Subsalt Imaging Examples," European Association of Geoscientists & Engineers, Geophysical Prospecting, 2004, 52, 607-623.

PCT International Search Report and Written Opinion, dated Nov. 12, 2020, issued in International Application No. PCT/IB2020/057345, filed on Aug. 4, 2020, 13 pages.

* cited by examiner

SYSTEM AND METHOD FOR SEISMIC IMAGING OF COMPLEX SUBSURFACE VOLUMES

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for seismic imaging and, in particular, to a method of seismic imaging using waveform inversion by relative data matching.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data may be inverted to generate an earth model that can be used to create seismic images which can be interpreted to identify subsurface geologic features including hydrocarbon deposits. The ability to define the location of rock and fluid properties in the subsurface using the inverted earth model and seismic interpretation is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for improved inversion to generate earth models for seismic imaging that will allow better seismic interpretation of potential hydrocarbon reservoirs.

SUMMARY

In accordance with some embodiments, a computer-implemented method of seismic imaging is disclosed that includes receiving a seismic dataset representative of a subsurface volume of interest and an earth model; generating extended image gathers by extended reverse time migration of the seismic dataset using the earth model; processing the extended image gathers to generate processed image gathers; performing extended modeling based on the processed image gathers to generate a modeled seismic dataset; enhancing the processed image gathers to generate an enhanced image; performing extended modeling based on the enhanced image gathers to generate a modeled enhanced dataset; differencing the modeled enhanced dataset and the modeled seismic dataset to determine a data residual; inverting the data residual to generate a model residual; updating the earth model based on the model residual to create an updated earth model; performing seismic imaging of the seismic dataset using the updated earth model to create an improved seismic image; and displaying, on a user interface, the improved seismic image.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Figure 1:
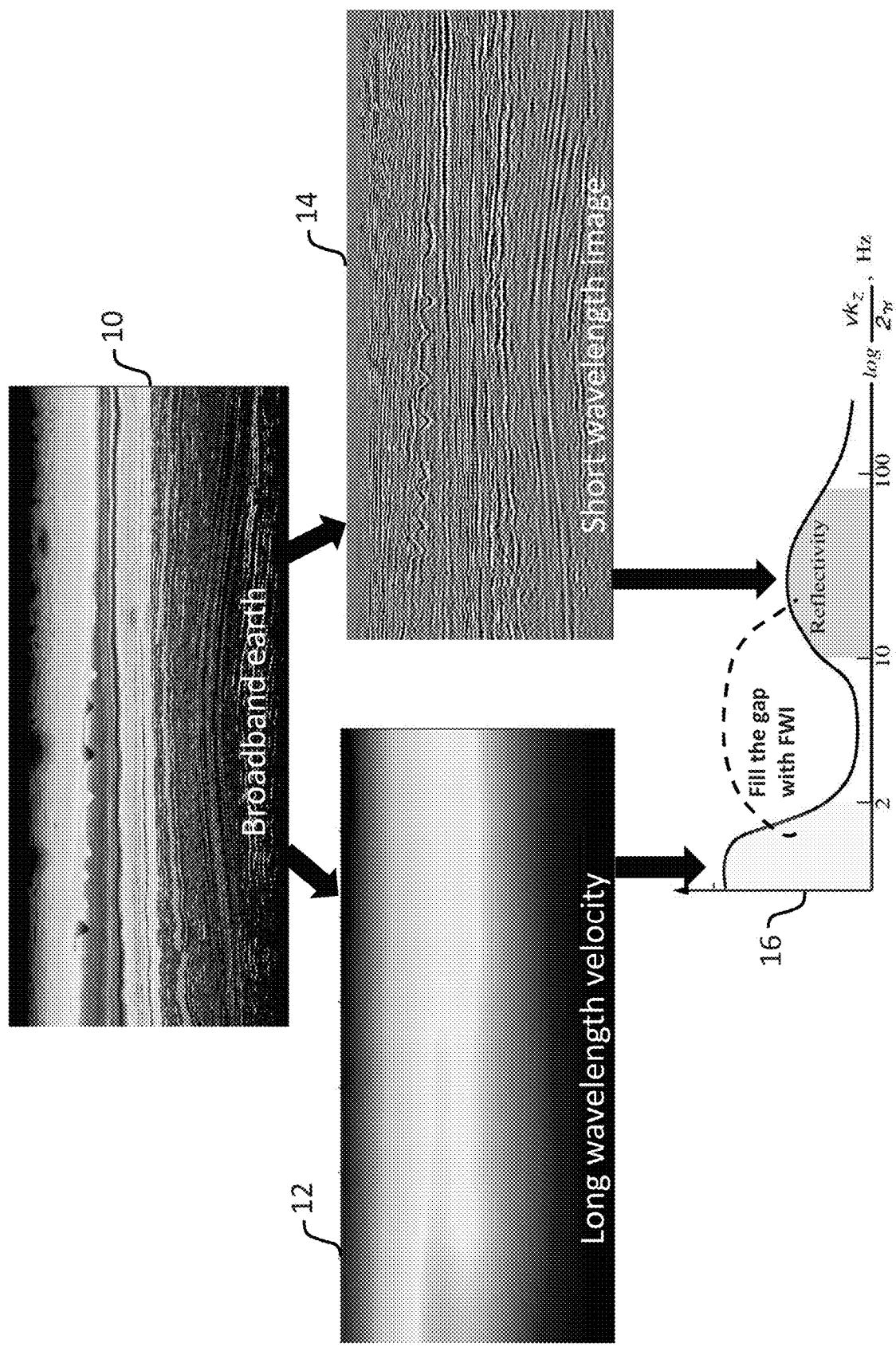
FIG. 1 illustrates the difficulties of seismic imaging.

Described below are methods, systems, and computer readable storage media that provide a manner of seismic imaging. These embodiments are designed to be of particular use for seismic imaging of subsurface volumes in geologically complex areas.

Advantageously, those of ordinary skill in the art will appreciate, for example, that the embodiments provided herein may be utilized to generate a more accurate digital seismic image (i.e., the corrected digital seismic image). The more accurate digital seismic image may improve hydrocarbon exploration and improve hydrocarbon production. The more accurate digital seismic image may provide details of the subsurface that were illustrated poorly or not at all in traditional seismic images. Moreover, the more accurate digital seismic image may better delineate where different features begin, end, or any combination thereof. As one example, the more accurate digital seismic image may illustrate faults and/or salt flanks more accurately. As another example, assume that the more accurate digital seismic image indicates the presence of a hydrocarbon deposit. The more accurate digital seismic image may delineate more accurately the bounds of the hydrocarbon deposit so that the hydrocarbon deposit may be produced.

Those of ordinary skill in the art will appreciate, for example, that the more accurate digital seismic image may be utilized in hydrocarbon exploration and hydrocarbon production for decision making. For example, the more accurate digital seismic image may be utilized to pick a location for a wellbore. Those of ordinary skill in the art will appreciate that decisions about (a) where to drill one or more wellbores to produce the hydrocarbon deposit, (b) how many wellbores to drill to produce the hydrocarbon deposit, etc. may be made based on the more accurate digital seismic image. The more accurate digital seismic image may even be utilized to select the trajectory of each wellbore to be drilled. Moreover, if the delineation indicates a large hydrocarbon deposit, then a higher number of wellbore locations may be selected and that higher number of wellbores may be drilled, as compared to delineation indicating a smaller hydrocarbon deposit.

Those of ordinary skill in the art will appreciate, for example, that the more accurate digital seismic image may be utilized in hydrocarbon exploration and hydrocarbon production for control. For example, the more accurate digital seismic image may be utilized to steer a tool (e.g., drilling tool) to drill a wellbore. A drilling tool may be steered to drill one or more wellbores to produce the hydrocarbon deposit. Steering the tool may include drilling around or avoiding certain subsurface features (e.g., faults, salt diapirs, shale diapirs, shale ridges, pockmarks, buried channels, gas chimneys, shallow gas pockets, and slumps), drilling through certain subsurface features (e.g., hydrocarbon deposit), or any combination thereof depending on the desired outcome. As another example, the more accurate digital seismic image may be utilized for controlling flow of fluids injected into or received from the subsurface, the wellbore, or any combination thereof. As another example, the more accurate digital seismic image may be utilized for controlling flow of fluids injected into or received from at least one hydrocarbon producing zone of the subsurface. Chokes or well control devices, positioned on the surface or downhole, may be used to control the flow of fluid into and out. For example, certain subsurface features in the more accurate digital seismic image may prompt activation, deactivation, modification, or any combination thereof of the chokes or well control devices so as control the flow of fluid. Thus, the more accurate digital seismic image may be utilized to control injection rates, production rates, or any combination thereof.

Those of ordinary skill in the art will appreciate, for example, that the more accurate digital seismic image may be utilized to select completions, components, fluids, etc. for a wellbore. A variety of casing, tubing, packers, heaters, sand screens, gravel packs, items for fines migration, etc. may be selected for each wellbore to be drilled based on the more accurate digital seismic image. Furthermore, one or more recovery techniques to produce the hydrocarbon deposit may be selected based on the more accurate digital seismic image.

In short, those of ordinary skill in the art will appreciate that there are many decisions (e.g., in the context of (a) steering decisions, (b) landing decisions, (c) completion decisions, (d) engineering control systems and reservoir monitoring in the following but not limited to: Tow Streamer, Ocean Bottom Sensor, VSP, DASVSP, and imaging with both primaries and free surface multiple, etc.) to make in the hydrocarbon industry and making proper decisions based on more accurate digital seismic images should improve the likelihood of safe and reliable operations. For simplicity, the many possibilities, including wellbore location, component selection for the wellbore, recovery technique selection, controlling flow of fluid, etc., may be collectively referred to as managing a subsurface reservoir.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Seismic imaging is considered key to reducing risk in exploration and development operations. Accurate imaging requires an accurate earth model. The earth model may include, for example, parameters of P-wave velocity ($V_P$), S-wave velocity ($V_S$), density ($\rho$), anisotropy, and the like. FIG. 1 illustrates the difficulties of accurately characterizing the broadband earth 10. The broadband earth 10 is comprised of the long wavelength velocity 12 and the short wavelet seismic image 14. Looking at these in frequency space 16, the long wavelength velocity goes into the low frequencies and the short wavelength image goes into the high frequencies. The notch in the graph needs to be filled in, for example by using some form of full waveform inversion.

Figure 2:
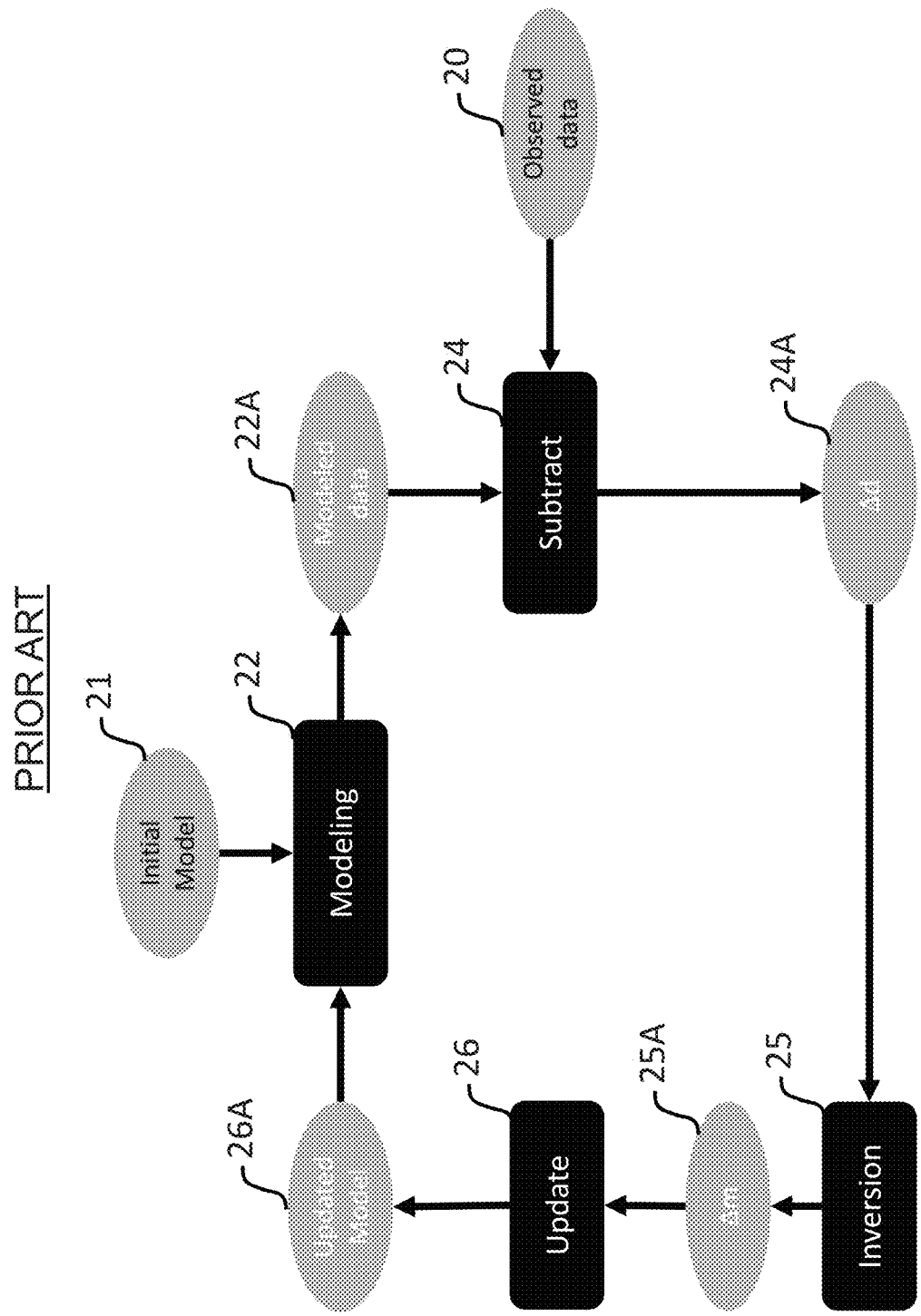
FIG. 2 illustrates a flowchart of a prior art method of seismic imaging.

Conventional methods for estimating velocities and other earth parameters rely on ray-based algorithms based on high frequency asymptotic approximations. In recent years, reflection full waveform inversion (RFWI), based on waveform matching, has been widely used in velocity updating. FIG. 2 illustrates a method of RFWI. It takes as input an initial earth model 21 and observed (i.e., recorded) seismic data 20. The initial earth model 21 is used for forward modeling 22, such as finite-difference modeling, to generate modeled data 22A. The modeled data 22A is subtracted 24 from the observed data 20 to find the data residual 24A. The data residual 24A is then inverted 25 using, for example, a least-squares inversion. The result of the inversion 25 is a model residual 25A. The model residual 25A is then used to update 26 the earth model so that an updated model 26A is created. This process can be repeated to refine the earth model further until the data residual 24A is below some threshold.

RFWI has three issues. First, it has cycle skipping problem if the initial earth model is not good enough. Second, RFWI tries to match the modeled data to the observed (i.e., field) data, which usually includes all kinds of noise that makes the inversion difficult. Third, it is difficult for RFWI to include interpretation into the inversion.

The present invention includes embodiments of a method and system for waveform inversion by relative data matching (WIRDM). WIRDM overcomes the difficulties of RFWI.

Figure 3:
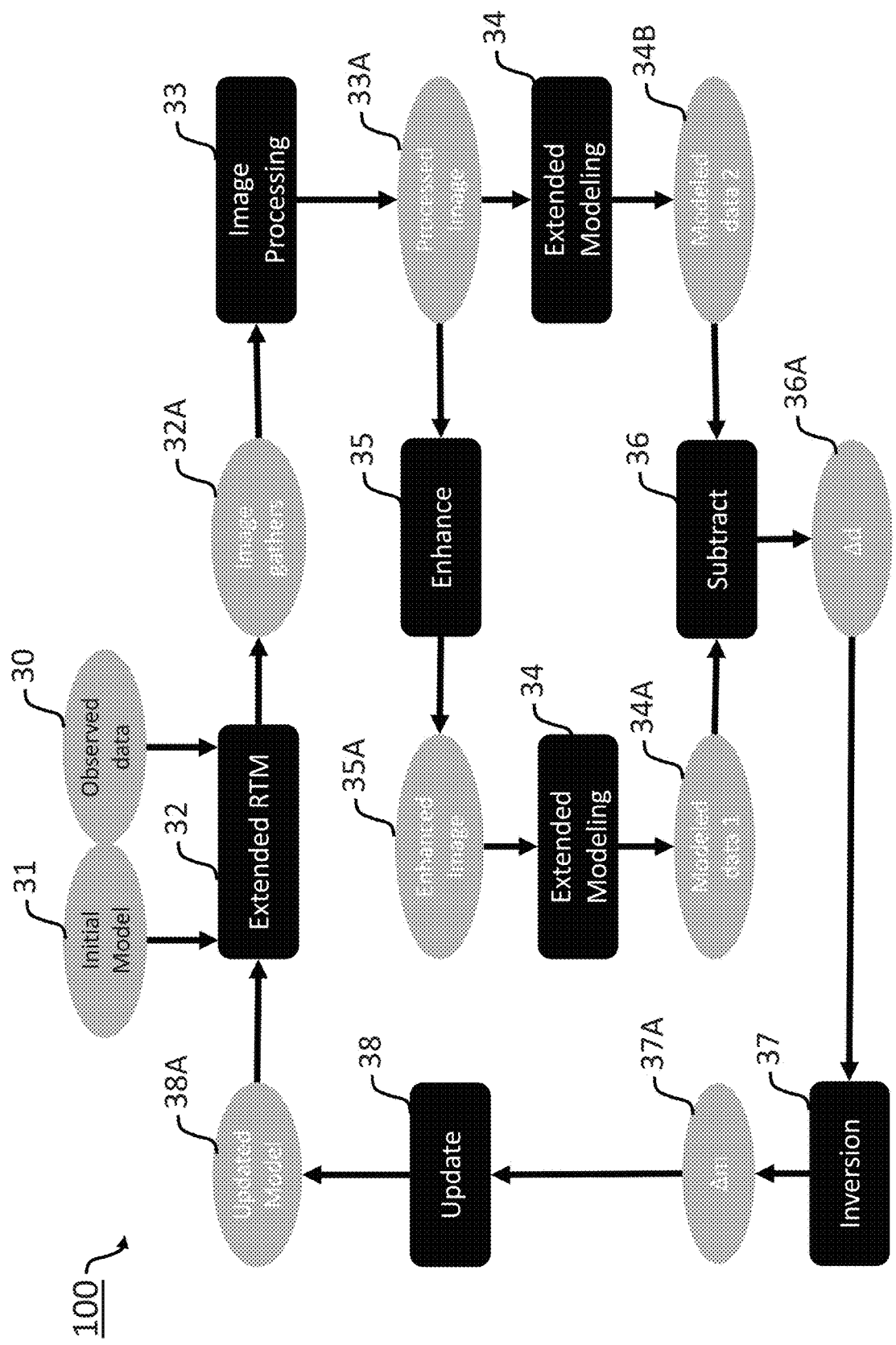
FIG. 3 illustrates a flowchart of a method of seismic imaging using waveform inversion by relative data matching, in accordance with some embodiments.

FIG. 3 illustrates a flowchart of a method 100 for seismic imaging of a complex subsurface volume of interest. The method takes input of an initial earth model 31 and observed (i.e. recorded) seismic data 30. The initial earth model 31 includes properties such as but not limited to compressional velocity ($V_p$), shear velocity ($V_s$), and density ($\rho$). The initial earth model may be 2-D (with one spatial axis and one time or depth axis) or 3-D (with two spatial axes and one time or depth axis). Extended reverse time migration (RTM) 32 generates image gathers 32A. Image gathers 32A make up a multi-dimensional volume with one or more spatial axes, an angle or offset axis, and a time or depth axis. By cross-correlating the source wavefield and receiver wavefield with a spatial shift or time shift (i.e., non-zero lag cross-correlation), a 3-D seismic volume with a time dimension becomes a 4-D volume, or a 3-D seismic volume with lateral spatial extension (x and y) becomes a 5-D volume. The image gathers 32A show seismic events which may be interpreted to identify subsurface geologic features such as rock formations and salt bodies. However, if the earth model used as input to the extended RTM 32 isn't accurate, the image gathers 32A will suffer from artifacts such as poor focusing of the events.

The image gathers 32A are subjected to image processing 33 to generate a processed image 33A. The image processing may include, by way of example and not limitation, denoising, amplitude balancing, and other filtering. As is known to those of skill in the art, there are many techniques for improving a seismic image by attenuating noise and improving amplitude content. For example, a mask or mute may be applied to part of the gathers, in the time/depth dimension or a spatial dimension or some combination thereof, to limit the image gathers to selected reflectors that are believed to be of significance for identification of a potential hydrocarbon reservoir. Comparing method 100 to the RFWI method on FIG. 2, a processed image 33A is not used in RFWI.

The processed image 33A may be enhanced 35 to generate an enhanced image 35A which improves the focusing of events in the gather. This enhancement may be accomplished, for example, by attenuating amplitudes at non-zero lag by applying a taper. Both the processed image 33A and the enhanced image 35A are subjected to extended modeling 34, for example extended Born modeling. This generates modeled datasets modeled data 1 34A and modeled data 2 34B which are at least 3-D. These modeled datasets are then subtracted 36 to create a data residual ($\Delta d$) 36A. The subtraction is done on a point-by-point basis so the data residual 36A has the same dimensionality as the modeled datasets. This should be compared with the RFWI example in FIG. 2, where the data residual is found by subtracting the modeled data from the observed (i.e. field or recorded) data. The method 100 shown in FIG. 3 subtracts two different modeled datasets, which is why this method is called waveform inversion by relative data matching.

The data residual 36A can then be used as input to an inversion 37 which will output a model residual ($\Delta m$) 37A. The inversion may be, for example, a non-linear conjugate gradient inversion. The model residual 37A is then used to update 38 the earth model to generate an updated model 38A. The process may then be repeated until the data residual 36A or the model residual 37A is sufficiently small (e.g., below a threshold such as a fixed number or percentage calculated by the computer or as specified by user). The resulting image from the last updated model 38A can then be used for interpretation of subsurface geologic features that may be used for identification of hydrocarbon reservoirs. As is well known to those of skill in the art, once a hydrocarbon reservoir is identified, the numerous advantages listed above may be leveraged in combination or separately.

Figure 4:
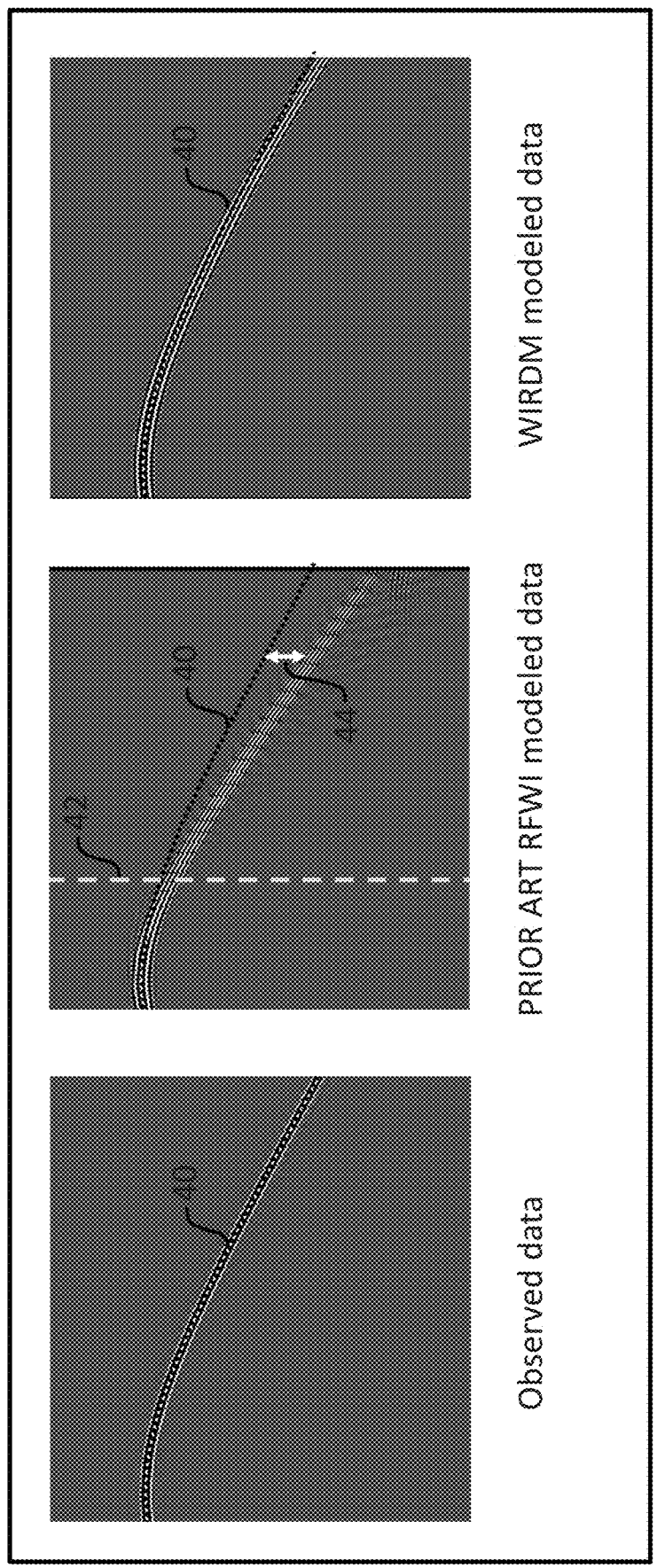
FIG. 4 compares the result of a prior art method and the result of an embodiment of the present invention.

FIG. 4 compares a result of a prior art method of FWI with a result of the present invention. The observed data panel on the left includes the simple offset gather used for this example. The data is overlain by a dashed line 40. After conventional RFWI, the RFWI modeled data in the center panel does not match the observed data. Using dashed line 40 as a guide, it appears that the RFWI modeled data is accurate to about line 42 then it deviates by an increasing amount 44. The right panel shows the WIRDM modeled data which matches dashed line 40 well for all offsets.

Figure 5:
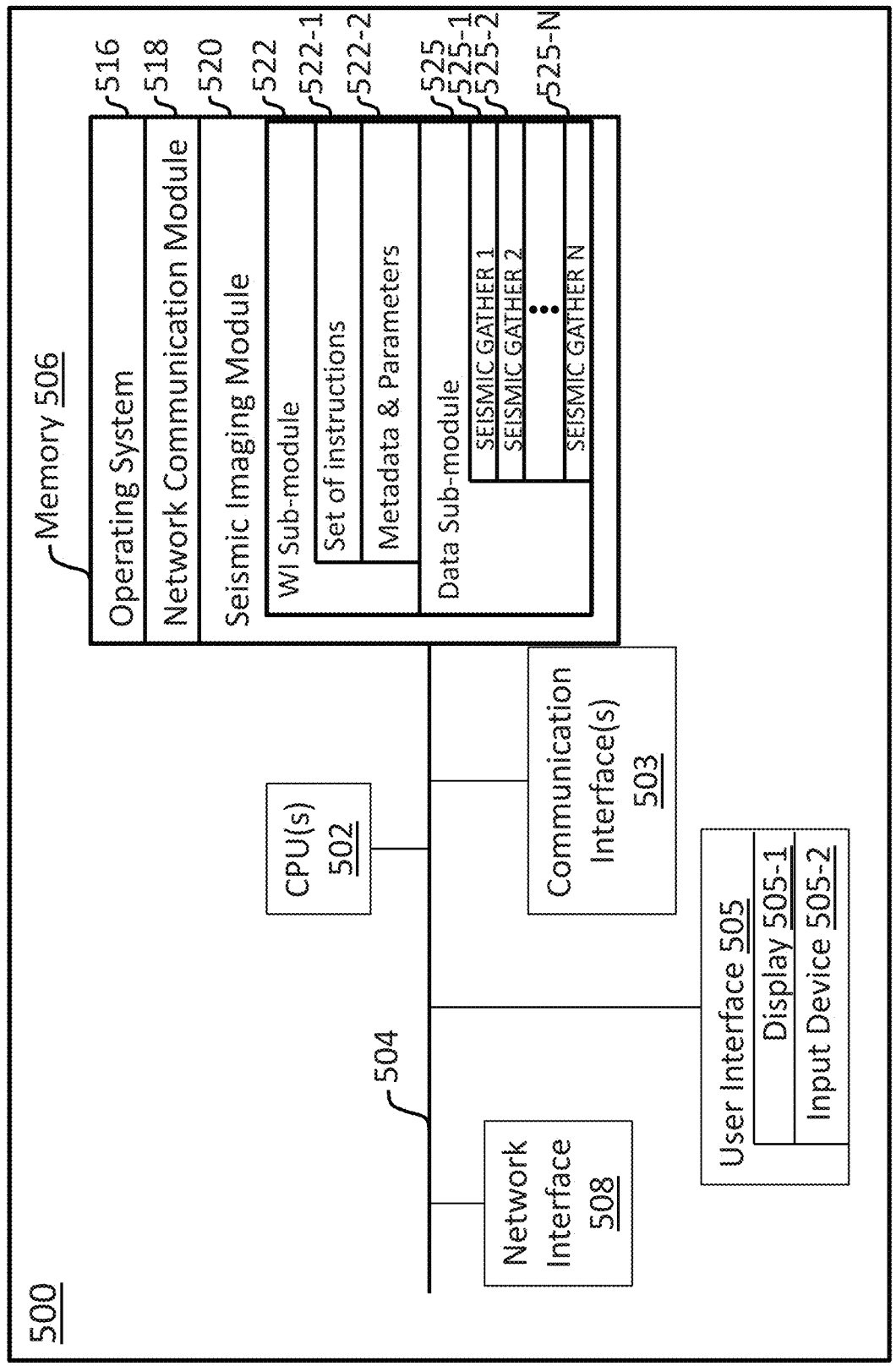
FIG. 5 is a block diagram illustrating a seismic imaging system, in accordance with some embodiments.

FIG. 5 is a block diagram illustrating a seismic imaging system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic imaging system 500 includes one or more processing units (CPUs) 502, one or more network interfaces 508 and/or other communications interfaces 503, memory 506, and one or more communication buses 504 for interconnecting these and various other components. The seismic imaging system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a seismic imaging module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the seismic imaging module 520 executes the operations of method 100. Seismic imaging module 520 may include data sub-module 525, which handles the seismic dataset including seismic gathers 525-1 through 525-N. This seismic data is supplied by data sub-module 525 to other sub-modules.

WI sub-module 522 contains a set of instructions 522-1 and accepts metadata and parameters 522-2 that will enable it to execute operations of method 100. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 5) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of seismic imaging, comprising:
   a. receiving, at a computer processor, a seismic dataset representative of a subsurface volume of interest and an earth model;
   b. generating, via the computer processor, extended image gathers by extended reverse time migration of the seismic dataset using the earth model;
   c. processing, via the computer processor, the extended image gathers to generate processed image gathers;
   d. performing, via the computer processor, extended modeling based on the processed image gathers to generate a modeled seismic dataset;
   e. enhancing, via the computer processor, the processed image gathers to generate an enhanced image;
   f. performing, via the computer processor, extended modeling based on the enhanced image gathers to generate a modeled enhanced dataset;
   g. differencing, via the computer processor, the modeled enhanced dataset and the modeled seismic dataset to determine a data residual wherein the differencing is done on a point-by-point basis so the data residual has a same dimensionality as the modeled enhanced dataset and the modeled seismic dataset;
   h. inverting, via the computer processor, the data residual to generate a model residual;
   i. updating, via the computer processor, the earth model based on the model residual to create an updated earth model;
   j. performing, via the computer processor, seismic imaging of the seismic dataset using the updated earth model to create an improved seismic image; and
   k. displaying, on a user interface, the improved seismic image.

2. The method of claim 1 comprising repeating steps b j until at least one of the data residual or the model residual is below a threshold.

3. The method of claim 1 further comprising using the improved seismic image to identify a hydrocarbon reservoir.

4. The method of claim 1 wherein the processing the extended image gathers includes masking the extended image gathers to select reflectors.

5. The method of claim 1 wherein the extended modeling is Born modeling.

6. A computer system, comprising:
one or more processors;
memory; a user interface including a graphical display; and
one or more programs, wherein the one or more programs are stored in the memory and configured to be executed by the one or more processors, the one or more programs including instructions that when executed by the one or more processors cause the system to:
   a. receive, at the one or more processors, a seismic dataset representative of a subsurface volume of interest and an earth model;
   b. generate, via the one or more processors, extended image gathers by extended reverse time migration of the seismic dataset using the earth model;
   c. process, via the one or more processors, the extended image gathers to generate processed image gathers;
   d. perform, via the one or more processors, extended modeling based on the processed image gathers to generate a modeled seismic dataset;
   e. enhance, via the one or more processors, the processed image gathers to generate an enhanced image;
   f. perform, via the one or more processors, extended modeling based on the enhanced image gathers to generate a modeled enhanced dataset;
   g. difference, via the one or more processors, the modeled enhanced dataset and the modeled seismic dataset to determine a data residual wherein the differencing is done on a point-by-point basis so the data residual has a same dimensionality as the modeled enhanced dataset and the modeled seismic dataset;
   h. invert, via the one or more processors, the data residual to generate a model residual;
   i. update, via the one or more processors, the earth model based on the model residual to create an updated earth model;
   j. perform, via the one or more processors, seismic imaging of the seismic dataset using the updated earth model to create an improved seismic image; and
   k. display, on the user interface, the improved seismic image.

7. A non-transitory computer readable storage medium storing one or more programs, the one or more programs comprising instructions, which when executed by an electronic device with one or more processors and memory, cause the device to
   a. receive, at the one or more processors, a seismic dataset representative of a subsurface volume of interest and an earth model;
   b. generate, via the one or more processors, extended image gathers by extended reverse time migration of the seismic dataset using the earth model;
   c. process, via the one or more processors, the extended image gathers to generate processed image gathers;
   d. perform, via the one or more processors, extended modeling based on the processed image gathers to generate a modeled seismic dataset;
   e. enhance, via the one or more processors, the processed image gathers to generate an enhanced image;
   f. perform, via the one or more processors, extended modeling based on the enhanced image gathers to generate a modeled enhanced dataset;
   g. difference, via the one or more processors, the modeled enhanced dataset and the modeled seismic dataset to determine a data residual wherein the differencing is done on a point-by-point basis so the data residual has a same dimensionality as the modeled enhanced dataset and the modeled seismic dataset;
   h. invert, via the one or more processors, the data residual to generate a model residual;
   i. update, via the one or more processors, the earth model based on the model residual to create an updated earth model;
   j. perform, via the one or more processors, seismic imaging of the seismic dataset using the updated earth model to create an improved seismic image; and
   k. display, on a user interface, the improved seismic image.

* * * * *